Aug. 25, 1964     C. F. TAYLOR     3,145,797
VEHICLE

Filed Sept. 21, 1960     9 Sheets-Sheet 1

INVENTOR.
CHARLES F. TAYLOR
BY
Horace B. Van Valkenburgh
ATTORNEY

Aug. 25, 1964   C. F. TAYLOR   3,145,797
VEHICLE

Filed Sept. 21, 1960   9 Sheets-Sheet 2

INVENTOR.
CHARLES F. TAYLOR
BY
Horace B. Van Valkenburgh
ATTORNEY

Aug. 25, 1964

C. F. TAYLOR 3,145,797

VEHICLE

Filed Sept. 21, 1960

INVENTOR.
CHARLES F. TAYLOR
BY
Horace B. Van Valkenburgh
ATTORNEY

Aug. 25, 1964  C. F. TAYLOR  3,145,797
VEHICLE
Filed Sept. 21, 1960  9 Sheets-Sheet 4
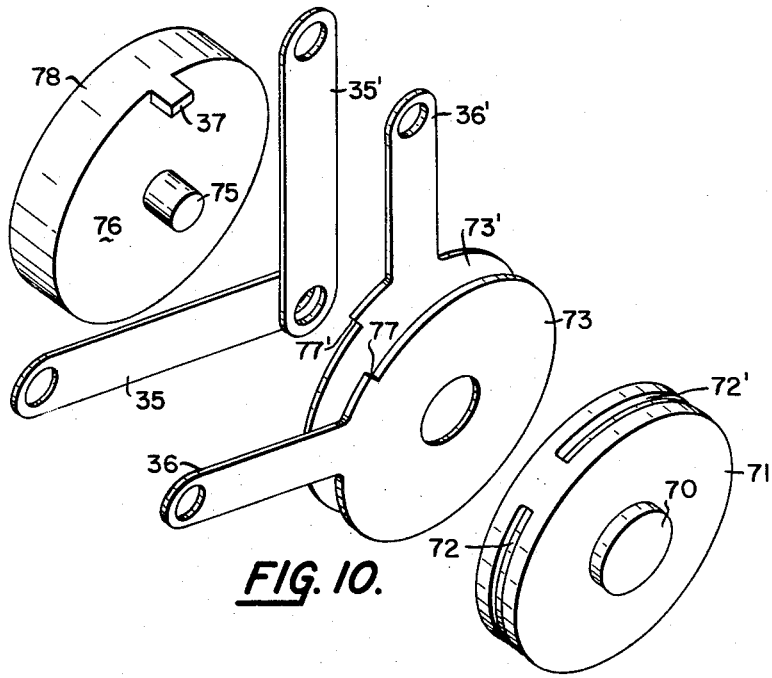
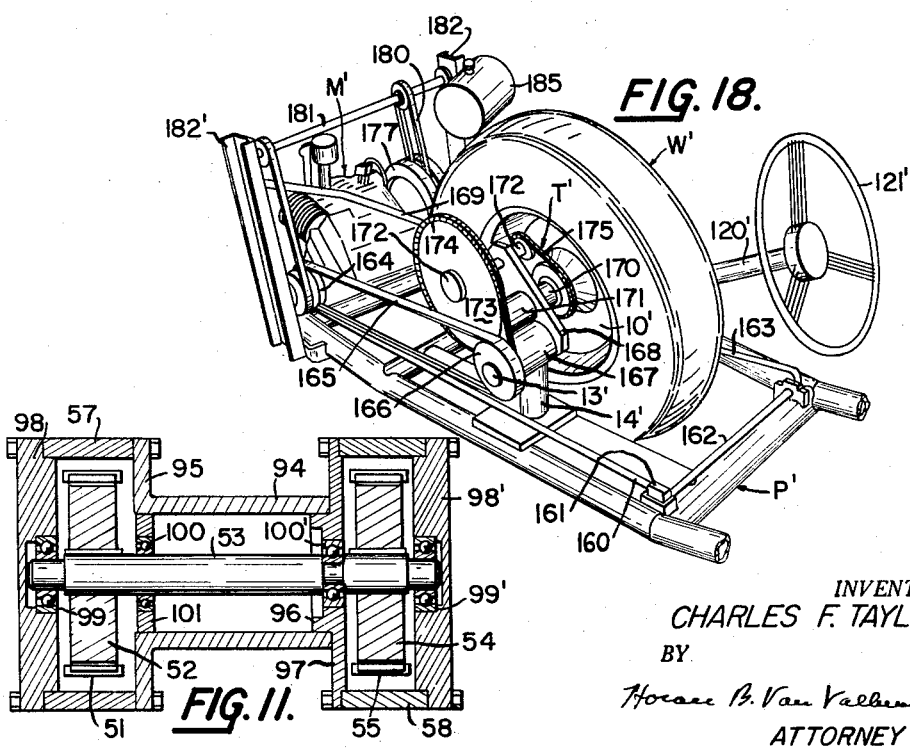
INVENTOR.
CHARLES F. TAYLOR
BY
Horace B. Van Valkenburgh
ATTORNEY

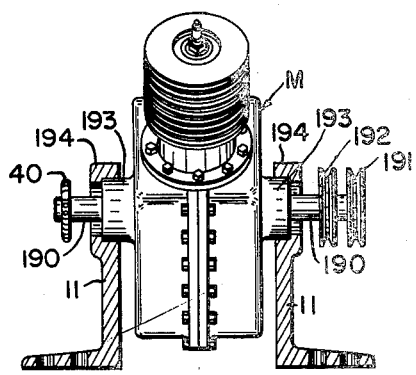
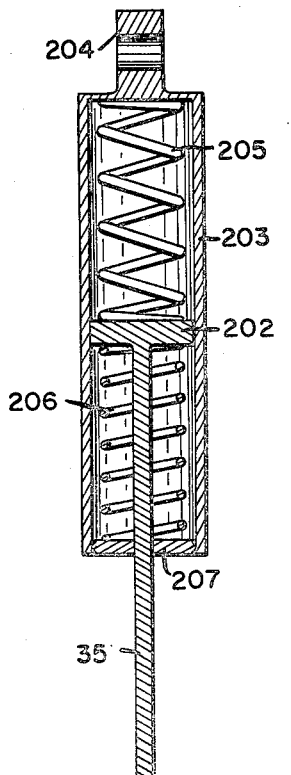
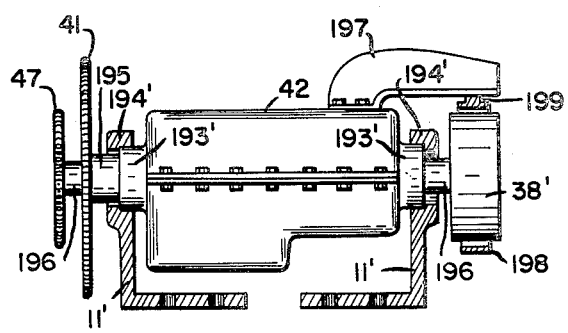

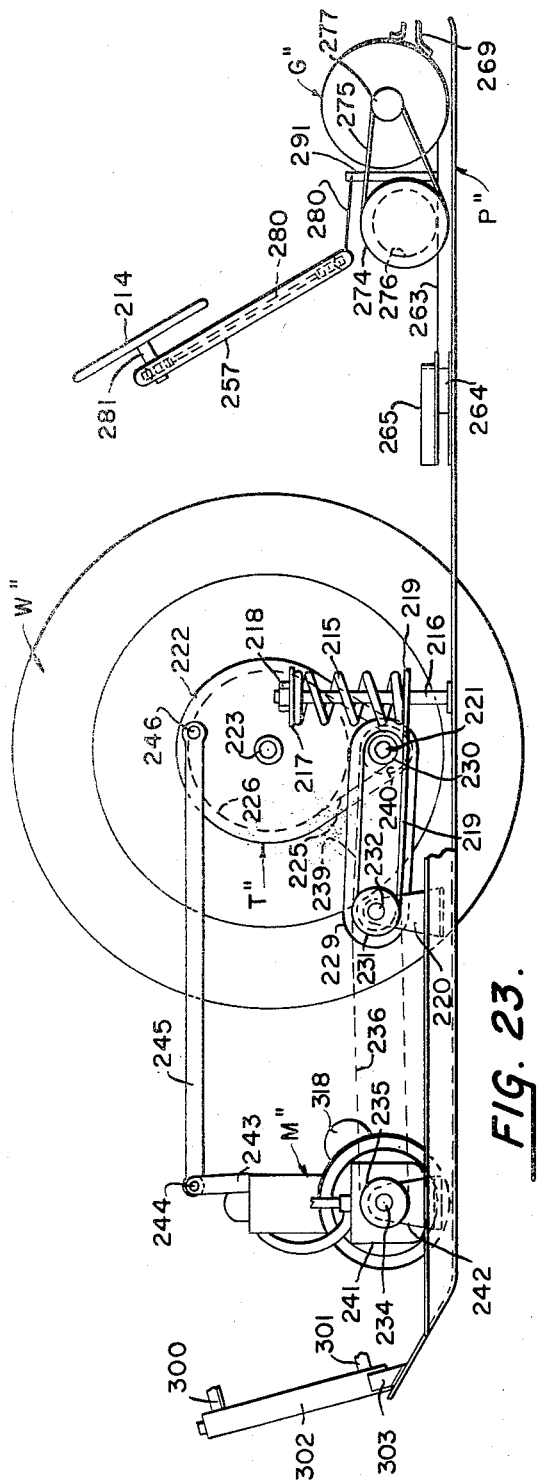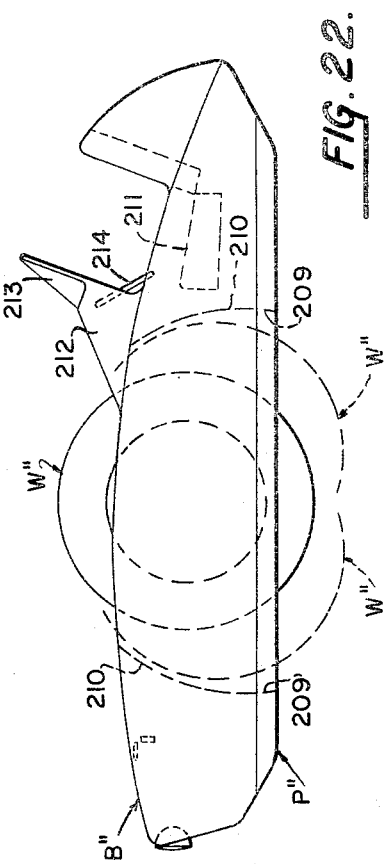

Aug. 25, 1964  C. F. TAYLOR  3,145,797
VEHICLE
Filed Sept. 21, 1960  9 Sheets-Sheet 8

INVENTOR.
CHARLES F. TAYLOR
BY
Horace B. Van Valkenburgh
ATTORNEY

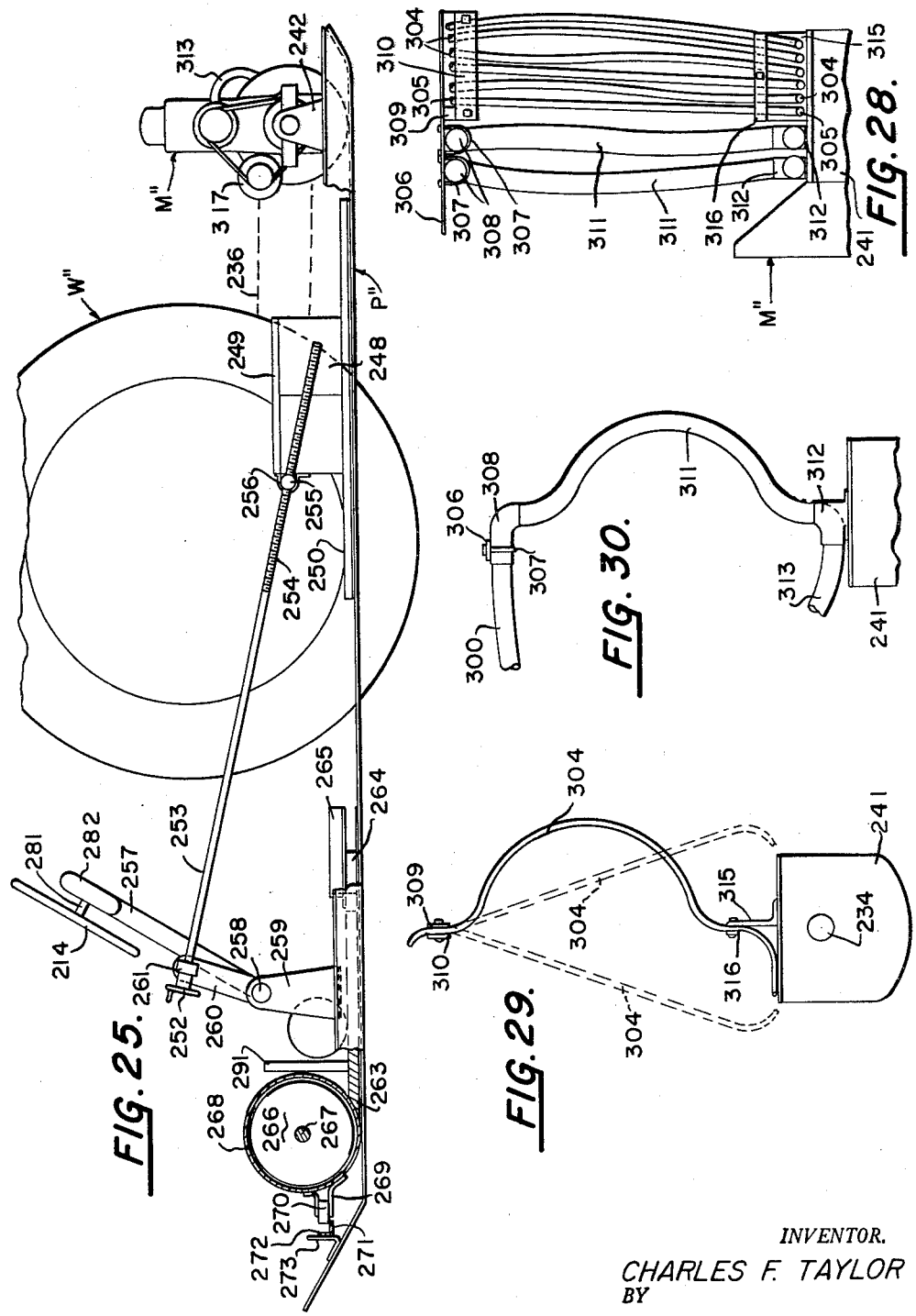

United States Patent Office 3,145,797
Patented Aug. 25, 1964

3,145,797
VEHICLE
Charles F. Taylor, Golden, Colo.
(2761 S. Fenton St., Denver 27, Colo.)
Filed Sept. 21, 1960, Ser. No. 58,876
26 Claims. (Cl. 180—21)

This invention relates to self-propelled vehicles, and more particularly to vehicles having a single supporting and driving wheel. This application is a continuation-in-part of my copending application Serial No. 591,633, filed June 15, 1956, and since abandoned.

A self-propelled four-wheeled vehicle, such as an automobile, truck or the like, requires a reasonably wide cleared path for operation. Thus, such vehicles are not adapted to be driven over mountain trails or rough terrian. Also, a two-wheeled vehicle, such as a motorcycle, can negotiate reasonably smooth trails without unduly sharp turns, but such vehicles run into difficulty in attempting to travel over rough terrian or trails which have a considerable amount of local irregularities. While a one-wheeled vehicle certainly cannot negotiate all terrain in the same manner as a four-footed animal or a man, it can be taken over relatively rough terrain and also over trails having sharp turns, as well as numerous local irregularities in the surface.

Among the objects of the present invention are to provide a novel self-propelled one-wheeled vehicle; to provide such a vehicle which may carry one or more passengers, as well as baggage or other articles; to provide such a vehicle in which the reaction torque of the motor and drive means, such as including a speed selection transmission, during either acceleration or deceleration may be automatically compensated for; to provide such a vehicle in which lateral, as well as longitudinal balance, may be effectively provided; to provide such a vehicle which may be steered without the necessity for an additional ground engaging wheel; to provide such a vehicle which may be supported at rest independently of the single drive wheel; as for the purpose of changing or repairing a tire on the driver wheel; to provide such a vehicle which may be cushioned against road shock; to provide such a vehicle in which variations in lateral wind pressure may be compensated for; to provide such a vehicle in which variations in longitudinal balance may be automatically compensated for; and to provide such a vehicle which may exist in more than one form.

Additional objects, as well as the novel features of this invention, will become apparent from the description which follows, taken in connection with the accompanying drawings, in which:

FIG. 10 is an exploded perspective view of certain parts shown also in FIGS. 7 and 8;

FIG. 11 is a vertical section taken along line 11—11 of FIG. 6;

FIG. 18 is a perspective view of the vehicle of FIG. 14, taken from a position rearwardly of the vehicle;

FIG. 19 is a rear elevation of a motor of FIGS. 1 and 2, with certain associated parts shown in vertical section;

FIG. 20 is a rear elevation of a transmission unit of FIGS. 1 and 2, with certain associated parts shown in vertical section;

FIG. 21 is a vertical section of a modified form of link;

FIG. 22 is a side elevation of a self-propelled, single wheeled vehicle constructed in accordance with this invention and forming a still further embodiment thereof;

FIG. 23 is a side elevation, on an enlarged scale and taken from the left side, of the vehicle of FIG. 22, but with the body removed to show details of construction;

FIG. 25 is a side elevation, taken from the left side, of the vehicle as shown in FIG. 23, with the rear portion in central longitudinal section and the sides of a platform broken away for clarity of illustration;

FIG. 28 is a fragmentary front elevation, on an enlarged scale, showing particularly the mounting of certain hoses and cables for the engine;

FIG. 29 is a fragmentary side elevation, corresponding to FIG. 28, showing particularly the configuration of the cables and also showing in dotted lines the position of the cables at the extremities of pivotal movement of the engine; and FIG. 30 is a fragmentary side elevation, corresponding to a portion of FIG. 28, showing particularly the configuration of the radiator hoses.

Figure 1:
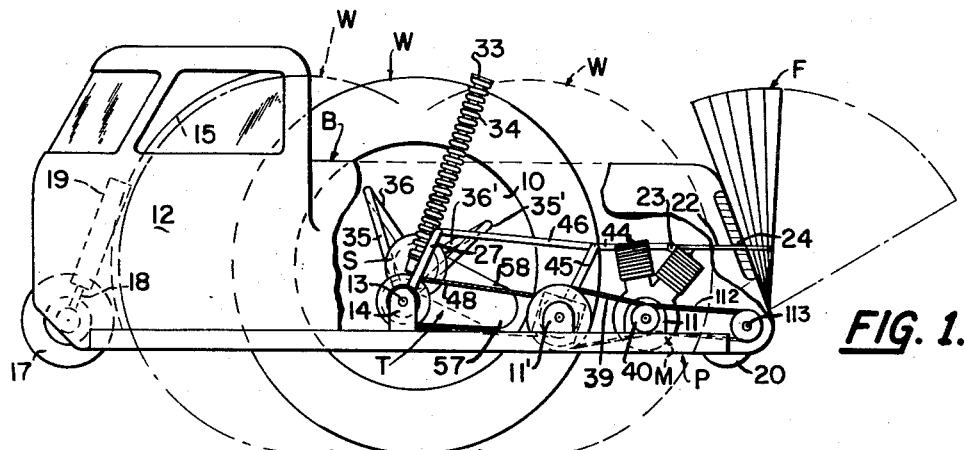
FIG. 1 is a side elevation of a self-propelled, one-wheeled vehicle constructed in accordance with this invention and forming one embodiment thereof, an outer portion being broken away to show interior parts more clearly.
Figure 2:
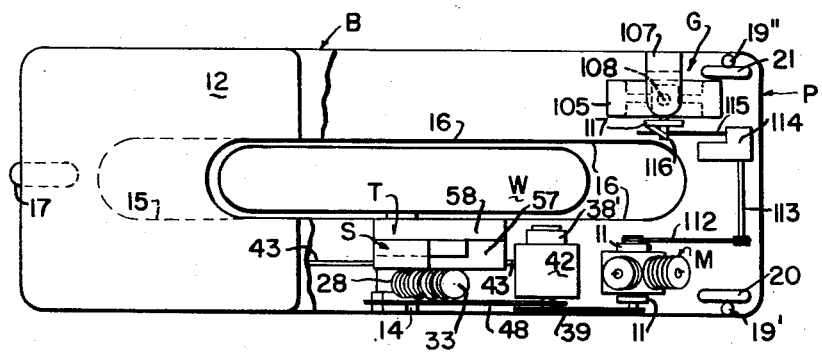
FIG. 2 is a top plan view of the vehicle of FIG. 1.

A vehicle constructed in accordance with this invention, as illustrated in FIGS. 1 and 2, may include a single supporting and drive wheel W which may include a disc 10 having a rim on which is mounted a pneumatic tire of suitable size and which is connected to a platform P through a torque reaction means T, responsive to the reaction torque of a motor M, which may be pivotally mounted on the platform P by brackets 11 and as also shown in FIG. 19 and described later. The drive between motor M and wheel W may extend through or be associated with the torque reaction means T, while a gyroscope G for steering purposes may also be driven from the motor M. A body B, which may include a cab 12, may be mounted on platform P, body B also housing the operating parts except for wheel W and a portion of the torque reaction means T, as will be described later. In general, platform P and the various parts and/or passengers mounted thereon are preferably balanced so that the center of gravity of platform P and such parts will be in approximately the vertical plane of a shaft 13 of FIG. 1, which is rotatably mounted in bracket 14, an outer bracket 14 being shown in FIG. 1, while an inner bracket, if desired, may be also provided. In rest position, or during zero acceleration, the wheel W is disposed slightly forwardly of the full position of FIGS. 1 and 2, i.e., with the axis of wheel W in the vertical plane of the center of gravity of the platform P and the parts mounted thereon, i.e., preferably at the vertical plane of the center of shaft 13, as in the position of FIG. 3. The torque reaction means T is adapted to cause the position of wheel W to shift relative to the center of gravity of the platform P and the parts mounted thereon, as from the central to the rear dotted position of FIG. 1, to compensate for maximum acceleration torque and to intermediate positions for acceleration torque less than the maximum, as well as to the front dotted position of FIG. 1 for maximum deceleration torque and intermediate positions for decelerating torque less than the maximum. In this way, the platform P is prevented from being tipped forwardly so that the front end will tend to dig into the ground upon deceleration, and prevented also from tipping rearwardly so that the rear end might drag upon the ground upon acceleration. To accommodate such movement of wheel W relative to platform P, cab 12 may be provided with a well 15 disposed above a front portion of a slot 16 in platform P, while wheel W may move within slot 16, which extends forwardly to the front edge of well 15 and rearwardly, as in FIG. 2, a sufficient distance to accommodate the movement of the wheel W to the rear dotted position of FIG. 1.

Since the vehicle of this invention is adapted to move over narrow winding mountain trails, as well as over relatively rough terrain, it may at times become necessary to repair or change the pneumatic tire on wheel W. Also, it may be desired to stabilize the platform P when the vehicle is at rest to permit loads of various types to be placed thereon or unloaded therefrom, as well as to permit the driver and perhaps the passengers to enter and leave cab 12 more readily. For this purpose, a small auxiliary front wheel 17 may be mounted at the forward lower end of cab 12 on an extensible and retractible arm 18 which may be mounted for movement within a cylinder 19, either hydraulically actuated or adjusted in position by a conventional pin connection. In addition, auxiliary wheel 17 may also act as a bumper in the event that a comparatively high unevenness in the ground is encountered, although it will be understood that auxiliary wheel 17 is not used for traction and does not normally engage the ground during movement of the vehicle. A similar auxiliary wheel 20 may be mounted at the rear of platform P, behind motor M, on a cylinder 19', which may be similar to cylinder 19. Also, on the opposite side of platform P, a third auxiliary wheel 21 may be mounted on a cylinder 19″. Each auxiliary wheel 17, 20 and 21 may be moved to ground engaging position, so that platform P may be supported at three points when wheel W is removed for repair or replacement of the tire thereon. Each of auxiliary wheels 17, 20 and 21 may be provided with a small pneumatic tire, if desired, while body B may have the same height over the length of platform P, but may more conveniently be lower rearwardly of cab 12. Thus, it may occur that the side pressure exerted by wind may tend to twist the vehicle about a vertical axis, about the bottom of wheel W, thereby throwing it off course. Thus, a longitudinally extensible and retractible element, such as an accordion or fan like member F, may be mounted at the rear of platform P behind motor M and adapted to be opened and closed, as between a closed position and the dot-dash position of FIG. 1, the full position of FIG. 1 being for a slight deceleration torque. Since the effect of deceleration torque is to move wheel W forwardly to or toward the front dotted position of FIG. 1, in which the longitudinal area of body B will decrease forwardly of the axis of wheel W and increase rearwardly of the axis of wheel W, less lateral area at the rear to balance wind pressure is desirable, so that fan F may be moved to a completely closed position during maximum deceleration. However, during acceleration, when wheel W moves rearwardly to or toward the rear dotted position of FIG. 1, it is desirable to provide additional area at the rear to compensate for wind pressure. Therefore, when motor M pivots rearwardly due to acceleration torque reaction, fan F will be opened, i.e., between the neutral or full line position of FIG. 1 and the fully extended, or dot-dash line position of FIG. 1, depending upon the amount of reaction and the amount of pivotal movement of the motor M, as through a link 22 connected between a bracket 23 on the motor M and the rear of fan F, as in FIGS. 1 and 3.

To compensate for variations in longitudinal weight distribution, as due to changing of loads during movement or a shifting of passengers' weight forwardly or rearwardly, a longitudinal weight balance device may be used, such as including an air pressure device A of FIG. 13, described later, having movable shutters 24 which are mounted at the rear of body B, as in FIG. 1. Also, in addition to turning of the gyroscope G to control the direction of movement, a lateral weight shift may also be produced, as by lateral movement of a weight 25 of FIG. 12, such as the case enclosing the battery, or other suitable weight, in a manner described in greater detail later. In general, the lateral shift of weight 25 compensates for the tendency of the vehicle to tilt outwardly upon turning.

As illustrated diagrammatically in FIG. 3, the torque reactions mean T may include a torque block 26 which is shown, for kinematic purposes, as pivoted on shaft 13 and provided with an arm 27 connected to the motor M by a lever or linkage system described later. Block 26 is also provided with a normally upwardly extending rod 28 which extends through a sleeve block 29 at the axis of wheel W, while sleeve block 29 is provided with a bearing 30 which receives the outer end of a floating shaft 31 which extends to a planetary gear system S. The planetary gear system in turn drives wheel W by a shaft 32, secured to disc 10 of wheel W. Rod 28 may be provided at its upper end with a flange 33 engaged by the upper end of a coil spring 34, with the lower end of spring 34 engaging sleeve block 29. Thus, spring 34 resists movement of block 29 and shaft 31 away from block 26 and shaft 13 and also resiliently sustains the load of platform P and associated weight, from the wheel W. If desired, a shock absorber may be associated with the spring 34 and the rod 28, or utilized in any other desired manner. In addition, a pair of scissor links, such as lower links 35 and 35' and upper links 36 and 36', may be connected between the position of shafts 13 and 31, such as the lower end of the lower scissor links 35 and 35' being pivoted adjacent the shaft 13 and the lower end of upper scissor links 36 and 36' being pivoted on or adjacent the center of shaft 31, with the upper ends of links 35 and 36, as well as links 35' and 36', being pivoted together. Links 35 and 35' may each be formed of telescoping parts with springs inside, such as shown in FIG. 21 and described later. An abutment 37 between upper scissor links 36 and 36' causes the planetary gear system S, through its reaction in driving wheel W, to move abutment 37 against one or the other of the upper scissor links 36 or 36', thereby pivoting the scissor links to one side or the other and increasing the separation between shaft 13 and 31, to compensate for the reaction torque of the planetary gear system by the combination of compressing spring 34 and shifting wheel W to obtain a gravity torque moment about shaft center 13. As will be evident, the displacement of wheel W during acceleration or deceleration is caused by pivotal movement of block 26 transmitted to rod 28 and sleeve block 29, as well as pivotal movement of scissor links 35 or 35′ transmitted from abutment 37, and such displacement by the shifting of wheel W relative to the center of gravity of platform P and associated weight provides a force opposing torque reaction of motor M and other parts of the drive means.

Figure 3:
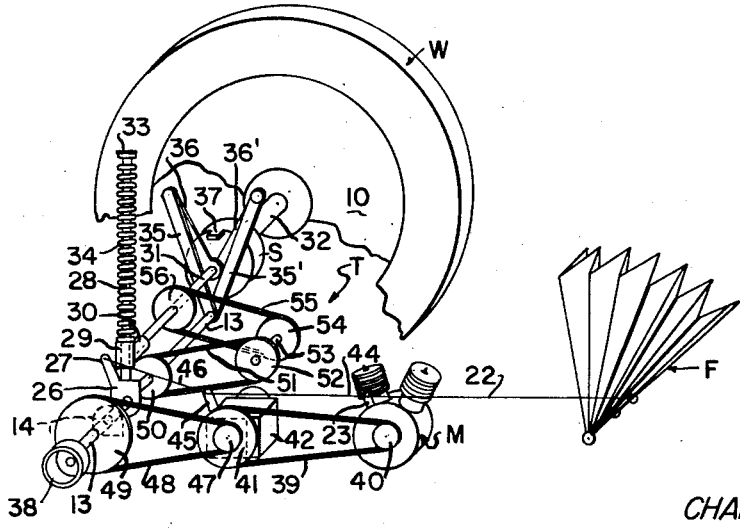
FIG. 3 is a perspective kinematic diagram of the drive wheel, engine and intermediate parts of the vehicle of FIG. 1.

If desired, a brake drum 38 may be associated with shaft 13, as in FIG. 3, while a suitable brake shoe and other parts, such as hydraulically actuated and operated from cab 12, may be associated therewith. The drive between motor M and the planetary gear system S may include a chain 39 engaging a sprocket 40 driven by motor M and a preferably larger sprocket 41 adapted to drive a transmission unit 42 which may be controlled in a suitable manner, as by a flexible, push pull cable 43 extending rearwardly from cab 12, as in FIG. 2 and beneath the torque reaction means T. The transmission unit 42 may be conventional in nature, either hydraulic and provided with a clutch, or provided with shiftable gearing and a clutch associated therewith, as in a conventional motorcycle transmission, and also may be controlled electrically, in which event cable 43 will be an electrical control cable. If desired, a brake drum 38′, as in FIG. 2, may be associated with transmission unit 42 and suitable braking parts associated therewith, as described above in connection with brake drum 38 of FIG. 3 and as shown in FIG. 20, described later. The transmission unit 42 is also pivoted on platform P, as on a front bracket 11′ of FIG. 1 and a similar bracket at the rear, as shown in FIG. 20, while the torque reaction of transmission unit 42 is also transmitted to arm 27 of block 26 along with the reaction torque of motor M. For this purpose, a link 44 may be connected with motor bracket 23 and also with an arm 45 affixed to the pivoted transmission unit 42, while a second link 46 may extend between transmission unit arm 45 and arm 27 on block 26. As will be evident, motor M and transmission unit 42 will pivot in unison and the total torque reaction of each will be transmitted to arm 27 and block 26 through the link 46. The output end of transmission unit 42 rotates a sprocket 47 driving a chain 48 which drives a preferably larger sprocket 49, keyed to lower shaft 13. An intermediate sprocket 50, also keyed to shaft 13, may drive, through a chain 51, a sprocket 52 keyed to a countershaft 53 on which is keyed a second sprocket 54, from which a chain 55 drives a sprocket 56, keyed to the upper shaft 31. A suitable housing arrangement, including a housing 57 for chain 51 and its associated sprockets and a housing 58 for chain 55 and its associated sprockets, housings 57 and 58 being shown in FIGS. 1, 4 and 5, may be connected respectively between lower shaft 13 and countershaft 53 and between countershaft 53 and upper shaft 31, so that movement of shaft 31 relative to lower shaft 13 will not interfere with the drive to wheel W.

Figure 4:
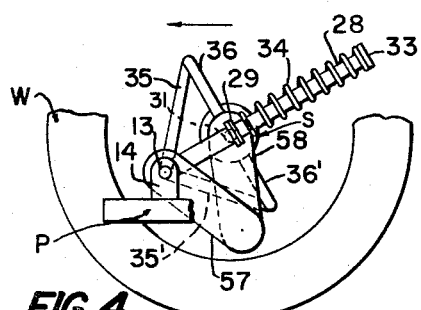
FIG. 4 is a fragmentary side elevation of certain parts shown in the diagram of FIG. 3, illustrating the position thereof during acceleration.
Figure 5:
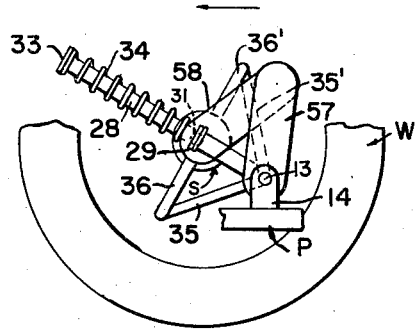
FIG. 5 is a fragmentary side elevation, similar to FIG. 4, illustrating the parts during deceleration.

As will be evident from FIGS. 4 and 5 in which the vehicle is moving in the direction of the upper arrows, upon acceleration, the motor M and transmission unit 42 of FIG. 3 will pivot rearwardly, which will cause the wheel W to move rearwardly, i.e., to the rear dotted position of FIG. 1 and, as in FIG. 4, compress the spring 34 by movement of sleeve block 29 upwardly along rod 28. The scissor links 35 and 36, as well as links 35′ and 36′, will assume the position of FIG. 4 while the chain housings 57 and 58 will also assume the position of FIG. 4. Upon deceleration, the motor M and transmission unit 42 of FIG. 3 will pivot forwardly, thereby causing the torque block 26 also to pivot forwardly, similarly to compress the coil spring 34. At the same time, the sleeve block 29, scissor links 35, 36 and 45′, 46′ and chain housings 57 and 58 will move to the position of FIG. 5. Due to the movement of portions of housings 57 and 58 below the level of platform P, as in FIG. 4, as well as the movement of portions of scissor links 35 and 36 below the same, as in FIG. 5, the platform P may also be provided with a longitudinal slot to accommodate such movement, while body B may be provided with a slot (not shown) through which rod 28 and spring 34 may extend for movement. While for lower amounts of acceleration and deceleration torque reaction, such as up to 0.3 G, shifting of wheel W relative to the center of gravity of the platform P may usually be found sufficient, for greater torque reactions, such as up to 0.8 G, the coil spring 34 or equivalent will normally be found necessary. In other words, if the movement of wheel W were unlimited, then the reaction torque to be counteracted may reach a relatively high value, but the movement of wheel W is limited by the amount which the upper shaft 31 can be displaced from the lower shaft 13, although the scissor links 35, 36, and 35′, 36′ increase the distance which the shaft 31 on the axis of wheel W may move relative to lower shaft 13, as compared with lever arm connection between these points, as in the modification of FIGS. 14–18, described later.

Figure 12:
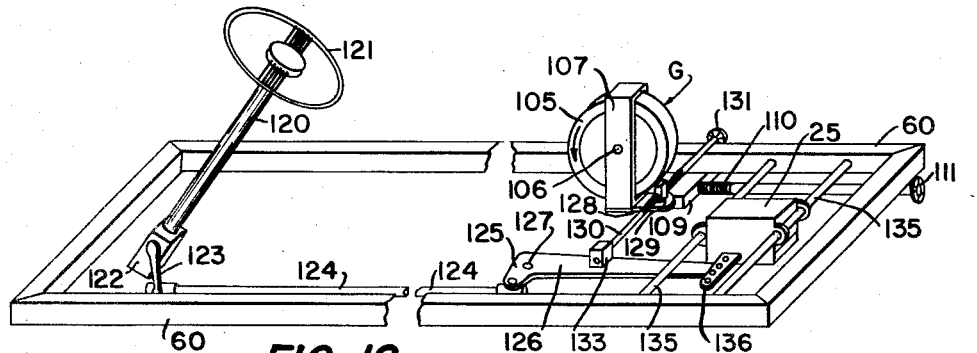
FIG. 12 is a condensed perspective view of the frame of the vehicle of FIG. 1 and parts associated therewith for steering and lateral balance during turning.
Figure 7:
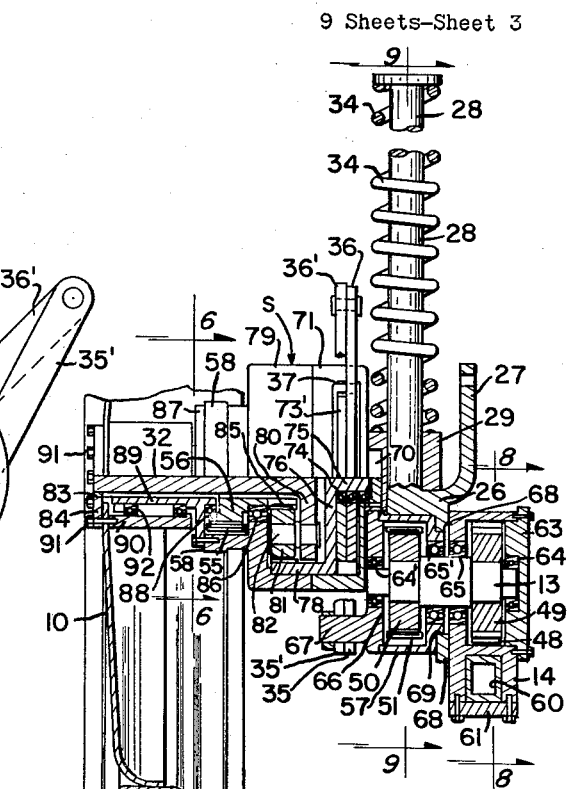
FIG. 7 is a half vertical section, taken along line 7—7 of FIG. 6, but showing also the drive wheel.
Figure 9:
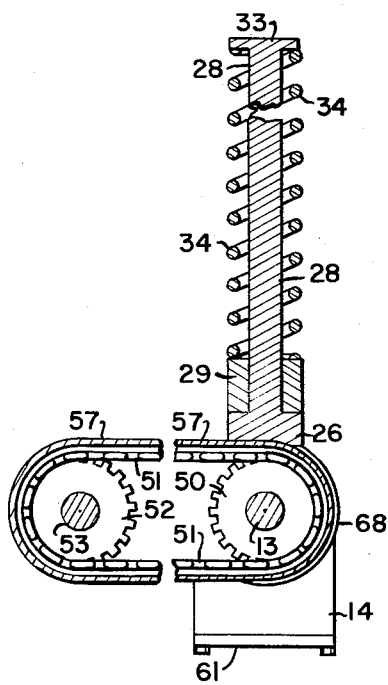
FIG. 9 is a vertical section, taken along line 9—9 of FIG. 7.
Figure 8:
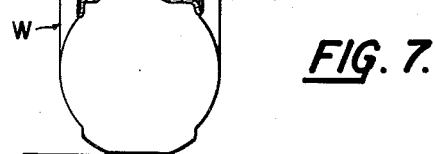
FIG. 8 is an enlarged vertical section, taken along line 8—8 of FIG. 7.

The platform P may be built on a framework, such as the rectangular framework 60 of FIG. 12, conveniently formed of rectangular hollow members, or in any other suitable manner, while as illustrated in FIG. 7, the underside of bracket 14 may be downwardly extended and U-shaped for clamping to framework 60, as by a plate 61. The lower shaft 13, as in FIG. 7, may be considerably shorter than is indicated diagrammatically in FIG. 3, since the illustration in FIG. 3 is primarily for kinematic purposes. Thus, bracket 14 may actually be hollow to accommodate shaft 13 and sprocket 49 therein and may be provided with a slot 62, as in FIG. 8, for chain 48, while an end cap 63 therefor may be provided with a recess to receive a ball bearing 64 for shaft 13 and a bearing 65 may be mounted in the opposite side of bracket 14. Housing 57, which encloses sprocket 50 and chain 51, may carry a ball bearing 65′ in one side and be provided with a circular opening at the opposite side to permit attachment, as by bolts, of a block 66 in which is mounted a bearing 64′ for shaft 13 and from the lower end of which a pin 67 may extend inwardly for pivotal attachment of the lower ends of lower scissor links 35 and 35′ thereto, the links being held on pin 67 in any suitable manner, as by a nut, as shown. The spring rod 28 and torque arm 27 may be attached in a suitable manner, as by welding, to torque block 26, or may be integral therewith, while block 26 may be provided with a depending annular ring 68 encircling an outwardly extending, annular flange 69 on housing 57, for pivotal movement relative thereto. Sleeve block 29 may be provided with a cylindrical recess, engaged by a cylindrical button 70 of FIG. 10, which extends centrally outwardly from a link housing 71, which is provided with an inwardly extending flange having slots 72 and 72′ therein, through which upper scissor links 36 and 36′ extend when in assembled relation as in FIG. 7. Upper links 36 and 36′ may be attached to or integral with a circular plate 73 or 73′, respectively, each plate 73 and 73′ having a central hole therein, as in FIG. 10, by which the upper links may pivot about a bearing 74 of FIG. 7, mounted on a pin 75, disposed centrally of and extending outwardly from a ring gear block 76 of the planetary unit, which is also provided with an outwardly extending ear 37 forming the abutment shown diagrammatically in FIG. 3. Each link plate 73 and 73′ may be provided with a shoulder 77 or 77′, respectively, for engagement with ear 37, it being noted that the position of shoulders 77 and 77′ is such that links 36 and 36′ can move together only until ear 37 is clamped between shoulders 77 and 77′ while torque reaction of the planetary unit in one direction will cause ear 37 to press against shoulder 77 and, in the other direction, against shoulder 77′. As in FIG. 7, block 76 may be provided with an inwardly extending flange 78 which is provided with gear teeth around its inner periphery, to form the outer or ring gear of the planetary gear unit, which is installed within a housing 79, conveniently integral with or welded to housing 58 for chain 55 and is also attached, as by cap screws, to link plate housing 71, slots 72 and 72′ permitting link plate housing 71 to pivot with housing 79 without disturbing links 36 and 36′. A spider 80 of the planetary gear system may carry a plurality of satellite gears 81 mounted on pins 82, the spider 80 conveniently being formed integrally with, or attached to shaft 32, conveniently provided at its outer end with spline teeth 83, for engagement with a hub and ring 84, having interfitting, internal spline teeth. Upper sprocket 56, driven by chain 55, may be provided with an axial bore surrounding shaft 32 and an axial extension 85 provided with gear teeth on the outside, to form the sun gear of the planetary unit, while a ball thrust bearing 86 for sprocket 56 may be mounted at the inner edge of housing 79. An end cap 87 for the upper end of housing 58 may also support a ball thrust bearing 88 for sprocket 56 and have an axial flange 89 which acts as a support tube for the wheel. A hub 90 is removably attached to disc 10 of wheel W, as by cap screws 91, which also extend through end ring 84 and disc 10. Ball thrust bearings 92 are mounted in hub 90 to permit its rotation relative to flange 89 and also to transmit the weight of and on platform P to wheel disc 10. As will be evident, wheel W may be removed by removal of hub ring 84, which also disconnects disc 10 from hub 90, after which wheel W may be tipped a slight amount so that disc 10 will clear the end of shaft 32, so that wheel W can then be lifted out of slot 16 in platform P.

As in FIG. 11, countershaft 53, to which sprockets 52 and 54 may be keyed adjacent opposite ends thereof, as shown, may extend between housings 57 and 58 through a sleeve 94 which is provided with a laterally outwardly extending flange 95 attached around a circular opening in the inside of the adjacent end of housing 57, the opposite end of sleeve 94 being in pivotal engagement with an annular flange 96 extending from a cap 97, attached around a similar circular opening in housing 58. End caps 98 and 98′ may close similar circular openings in the outside of housings 57 and 58, respectively, while each end cap may be provided with a central recess receiving end ball thrust bearings 99 and 99′, respectively, for shaft 53. A ball thrust bearing 100 for shaft 53 may also be carried by a ring 101 attached to the inside of sleeve 94 adjacent sprocket 52, while a similar bearing 100′ may be mounted in cap 97. As will be evident, sleeve 94 is prevented from separating from cap 97, by shaft 53, through thrust bearings 99, 99′ and 100, 100′.

The gyroscope G may include a cylindrical weight wheel 105 of FIGS. 2 and 12, which is mounted for rotation in the direction of the arrow about a horizontal shaft 106, disposed in suitable bearings in an enclosing bracket 107, which in turn is pivotal about a vertical axis, as on a pin 108 mounted on platform P and indicated in dotted lines in FIG. 2. Pin 108 of FIG. 2, on the underside of bracket 107, may be mounted on a slide 109 of FIG. 12, actuated by a lead screw 110, provided with a hand wheel 111 at the rear end of the vehicle, for adjusting the position of gyroscope G longitudinally of platform P and thereby maintain an approximation of weight balance about the center of shaft 13 of FIG. 1, as an axis. As in FIG. 2, the gyroscope G may be driven from motor M through a belt 112 which is connected through suitable pulleys and a countershaft 113, in turn connected to a constant speed drive mechanism 114 of any suitable type, such as including the combination of the drive pulleys of Miner U.S. Patents Nos. 2,553,505 and 2,711,303. The constant speed drive mechanism may, of course, be constructed in any other suitable manner, as long as a substantially constant speed of rotation of the gyroscope weight wheel 105 is produced, irrespective of the speed of rotation of the input countershaft 113. The drive mechanism 114 may be connected with the shaft 106 of weight wheel 105 in any suitable manner which will permit the gyroscope G to pivot about the pin 108 of FIG. 2 and will accommodate the longitudinal adjustment of the gyroscope. Thus, as in FIG. 2, drive mechanism 114 may be adapted to rotate a splined shaft 115 on which is mounted a splined pulley 116 adapted to move along shaft 115 in accordance with the longitudinal position of the gyroscope. Pulley 116 may be connected to a pulley 117 on the gyroscope shaft by a twisted V-belt which will permit the gyroscope to turn in either direction, such as 30° to 40° from its normal position, in which weight wheel 105 rotates in a plane longitudinal of the vehicle. As will be evident, rotation of the gyroscope weight in such a position increases lateral stability of the vehicle. It will be understood, of course, that any other suitable type of drive mechanism which will accommodate the movement of the gyroscope G may be used, such as a drive shaft assembly which includes two or more universal joints. Also, the constant speed drive mechanism 114 may be mounted for movement either upwardly or downwardly, or longitudinally of the platform P, to accommodate more readily the movement and positioning of the gyroscope G.

The gyroscope may be turned, for steering purposes, in any suitable manner, as through the arrangement illustrated in FIG. 12 and mounted on the framework 60 on which platform P may be built. Thus, a steering column 120 having a steering wheel 121 at the top may be installed within the cab 12 of FIG. 1, as at a position as close to the center as possible, so that it may be operated from either side, in the event that the driver is the only person in the cab and wishes to sit at one side or the other for weight distribution. The steering wheel 121 may be connected with conventional mechanism, such as of the warm variety, in a steering unit 122 adapted to move on arm 123 forwardly or rearwardly. Arm 123 may be pivotally connected to a rod 124, in turn pivotally connected to an arm 125 of a lever 126, pivoted on a pin 127 mounted on platform P. An arm 128, attached to gyroscope bracket 107, may be provided with a pivoted nut 129, engaged by a threaded rod 130 having a hand wheel 131 at its outer end adjacent the edge of platform P, in an accessible position. At its inner end, rod 130 may pivotally engage a cylindrical block 133, in turn pivotally mounted on lever 126. As will be evident, hand wheel 131 may be turned to adjust the length of the linkage connection between lever 126 and gyroscope arm 128, when the longitudinal position of the gyroscope is shifted by lead screw 110, to insure that the gyroscope weight wheel will rotate in a plane parallel to the longitudinal axis of the vehicle, unless turned for steering purposes. The linkage system and the various parts operative between steering wheel 121 and gyroscope G should be such that if it is desired to turn the front of the vehicle to the left, the front of gyroscope G will be turned to the right, which, through the precessional motion of the gyroscope will cause a left bank. The left bank of the machine will cause a secondary precessional motion of the gyroscope which would be a left turn. Similarly, if the front of the vehicle is to be turned to the right, then the front of the gyroscope should be turned to the left.

As indicated before, a weight 25, which may be slidably mounted on laterally extending rods 135, may be simultaneously moved when the gyroscope is turned so as to produce a tendency for the vehicle to tip to one side or the other as a turn is made and thus augment the moment causing the secondary precessional motion mentioned above. Thus, the weight 25 may be pivotally attached to the rear end of lever 126, as by a bracket 136 whose position on lever 126 may be adjusted, so that weight 25 will be moved to the right side of the vehicle when the front of the gyroscope is turned to the left, and vice versa. Also, the distance the weight 25 is shifted from its normal position, centrally of framework 60 and therefore of platform P, will be proportional to the amount which gyroscope G is turned. Also, if a lateral shift in weight for lateral balance is desired, the normal position of weight 25 may be adjusted by changing the point of connection of bracket 136 to lever 126, and for convenience in so doing, bracket 136 may be replaced by a lead screw having a hand wheel, for adjusting the position of weight 25 relative to lever 126. The weight 25 may be placed in a relatively low position, so as not to interfere with any of the parts above, and therefore is conveniently disposed between the sides of the framework 60, although any other desired position of weight 25 may be used, such as adjacent the front of platform P, rather than the rear.

Figure 13:
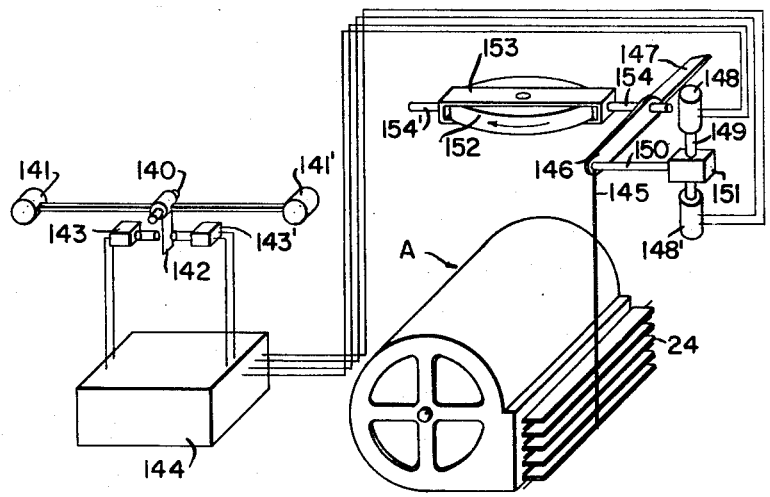
FIG. 13 is a perspective view of one form of mechanism which compensates for variations in longitudinal balance.

As indicated previously, in order to compensate for variations in longitudinal balance, an air blower A provided with shutters 24, as in FIG. 13, may be utilized, although it will be understood that any other type of force producing device responsive to changes in longitudinal balance may be used, such as means for automatically shifting a weight or the like. The device of FIG. 13 may include a pivot pin 140 for a pair of weights 141 and 141', spaced forwardly and rearwardly of the pin 140 and disposed longitudinally of the vehicle. A plate 142 may be attached to pin 140, so as to be movable whenever the weights 141 and 141' shift due to changes in longitudinal balance. The plate 142, as it shifts, may be adapted to change the reluctance of the air gap of a pair of devices 143 and 143' sensitive thereto, which may operate on the induction principle, although the devices 143 and 143' may operate on any other suitable principle, such as magnetic. Suitable electrical apparatus for transmitting control impulses in response to the signals emanating at devices 143 and 143' may be placed within a housing 144, any suitable arrangement of electrical parts being adapted to be used, such as in which a current, voltage or other electrical effect from device 143 is balanced against the effect produced by device 143', so that unbalance thereof will produce a control signal which may control any suitable means for shifting shutters 24 to a desired position. As will be evident, shutters 24 may be tilted either to change the direction of the air or the amount of air discharged from the air pressure device A, such as a blower. A rod 145 connected to a lever 146, which acts against a leaf spring 147 in any position except a central position, may be used to move the shutters 24 to the desired positions. The opposite end of leaf spring 147 may be fixed in any suitable manner, so that the leaf spring 147 will act as a centering bias for the shutter-gyro-magnetic-armature control mechanism. For shifting the lever 146 in an appropriate direction, the cores of a pair of solenoids 148 and 148' may be connected by a rod 149 and the movement of rod 149 may be transmitted to lever 146, as through a rod 150 attached to the lever 146 and to rod 149, as by a block 151. A counter balancing effect, which tends to dampen out fluctuations in the responses to the signals or other actuating effects produced by devices 143 and 143' may be provided by a gyroscope having a weight wheel 152 rotating in the direction of the arrow and in a horizontal plane, i.e., about a vertical axis, within a bracket 153, which is pivoted on pins 154 and 154', the former being connected to lever 146 to resist movement of lever 146 from a central position. Since the gyroscope weight wheel 152 precesses as an angular velocity sensing device, it tends to damp out over correction by the static position electrical sensing devices described above. The gyroscope bracket 153 should be pivoted about an axis extending longitudinally of the vehicle, i.e., with the axis of the pins 154 and 154' disposed longitudinally of the vehicle, as shown. The weight wheel 152 may be driven by a small motor, while the blower in air pressure device A may also be driven by a motor, each conveniently being an electrical motor and supplied with current from the battery for the motor M of FIG. 1, or in any other suitable manner. As will be evident, the lever 146 is shifted whenever the solenoid 148 or 148' is energized, but moves against the increasing pressure of the leaf spring 147 as the movement increases in either direction. Thus, small fluctuations in longitudinal balance will not be particularly effective, but if unbalance continues, then the lever 146 will be moved. Also, the leaf spring 147 will tend to move the gyroscope wheel 152 back to a central, or horizontal position, so that upon deenergization of either solenoid, the lever 146 will be automatically returned to a central, or neutral position. As will be evident, the steering gyroscope G of FIGS. 2 and 12 assists in maintaining lateral stability.

Although a shift of the wheel W relative to the platform P is accomplished through a torque responsive device and a preferred embodiment thereof has been described above, it will be understood that other devices for shifting the wheel W may be used. Thus, a simple lever arrangement may be used, as will be described hereinafter in connection with FIGS. 14 to 18, or wheel W may be merely translated along the platform P, as through a rack and pinion arrangement, such as a fixed rack mounted on the platform and a movable rack which engages a pinion, which in turn engages both racks and is disposed therebetween, the pinion being connected to the axis or shaft of the wheel W. In the latter arrangement, the movable rack may be driven by a mechanical linkage arrangement or by a hydraulic device controlled by the torque reaction of the motor and transmission parts.

Figure 14:
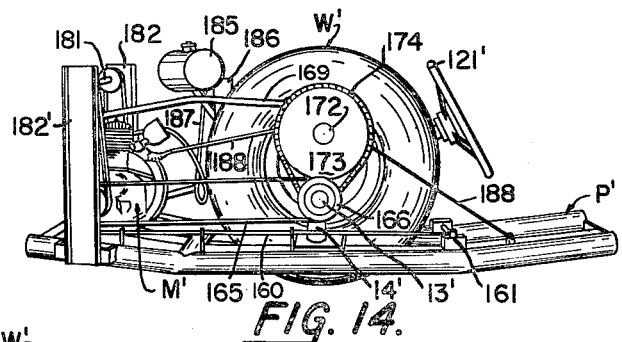
FIG. 14 is a side perspective view, of a self-propelled single wheeled vehicle constructed in accordance with this invention and forming an additional embodiment thereof.
Figure 15:
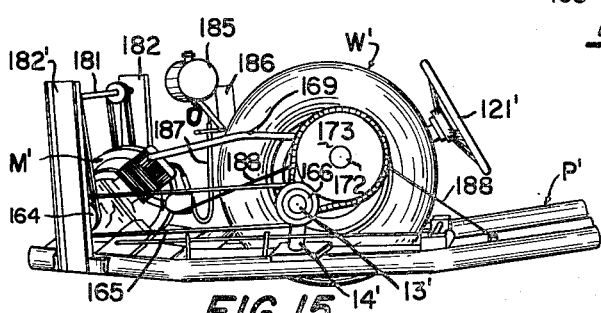
FIG. 15 is a side perspective view, of the vehicle of FIG. 14 during acceleration.
Figure 16:
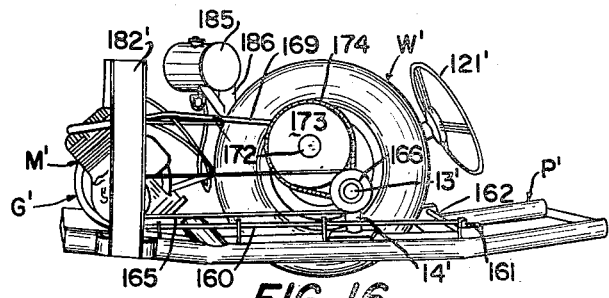
FIG. 16 is a side perspective view, similar to FIG. 15, but illustrating deceleration.
Figure 17:
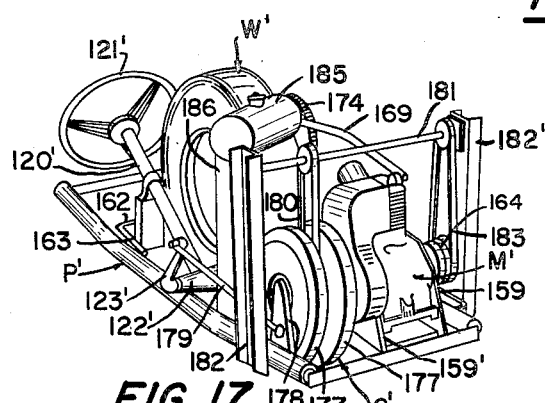
FIG. 17 is a perspective view of the vehicle of FIG. 14, taken from a position forwardly of the vehicle.

In the embodiment of this invention illustrated in FIGS. 14-18, a wheel W' may be associated with a platform P', on which is mounted a motor M' pivoted in brackets 159 and 159' of FIG. 17, which may be movable longitudinally of the platform P' by a control rod or link 160 connected by a cam and sliding block 161 or other suitable arrangement, as in FIG. 14, with a transverse rod 162 provided at its opposite end with a lever 163, as in FIG. 17, so that lever 163 may be shifted to move motor M' forwardly and thereby tighten a motor pulley 164 of FIG. 18 against a belt 165, thus providing a relatively simple but effective clutch arrangement, although other types of clutches may be utilized. A belt 165 may engage a pulley 166 mounted on a lower shaft 13', which, as in FIG. 18, is adapted to rotate within a bearing sleeve 167 mounted atop a bracket 14' which is attached at its lower end to the platform P'. A torque plate or lever 168 may be pivotally attached to sleeve 167 and connected by a torque arm 169 with the motor M', as in FIGS. 15 and 17, while a wheel shaft 170 may rotate in a bearing 171 mounted on torque plate 168. Torque plate 168 may also carry a countershaft 172 on which is mounted a sprocket 173 driven by a chain 174 by a smaller sprocket (not shown) mounted on shaft 13' inside pulley 166, while countershaft 172 may drive wheel shaft 170 through a chain 175 extending therebetween over suitable sprockets. A reduction effect may be obtained by making the driving sprockets for each of chains 174 and 175 smaller than the driven sprockets. As will be evident, the torque reaction of the countershaft 172 and also wheel shaft 170 is transmitted to torque plate 168 and in the same direction as the force transmitted through torque arm 169 from motor M'. When at rest or moving without acceleration or deceleration, the sprocket 173 will be directly above the shaft 13', as in FIG. 14, indicating that the wheel shaft 170 will be disposed directly above the lower shaft 13'. However, upon acceleration motor M' will pivot, as to the position of FIG. 15, so that the torque arm 169 and also the torque reaction at countershaft 172, will shift the wheel W' to the position of FIG. 15, i.e., rearwardly of the center of gravity of the platform P', which is preferably located in the transverse plane of lower shaft 13'. This will balance the torque reaction and maintain the platform P' on an even keel, as it were. Also, the amount which the wheel W' shifts will be proportional to the acceleration torque. Upon deceleration, the motor M' will pivot, such as to the position of FIG. 16, and the torque arm 169 will shift wheel W' forwardly so that the axis of wheel W' will be forwardly of the center of gravity of the platform at shaft 13'. Again, the movement of wheel W' forwardly will be proportional to the deceleration torque, while the deceleration torque at countershaft 172 will again be cumulative, i.e., in the same direction as the pull of torque rod 169.

The apparatus of FIGS. 14–18 may also be provided with a gyroscopic steering device, such as including a gyroscope G', which may include a pair of weight wheels 177 of FIG. 17, mounted for rotation about a horizontal axis on a bracket 178, the base of which is, in turn, pivotal about a vertical axis on platform P'. A steering unit, which may include a steering column 120' provided with a steering wheel 121' and connected to a conventional worm and gear unit 122', adapted to move a lever 123', may be mounted on platform P'. Lever 123' may be connected by a steering lever 179 with gyroscope bracket 178, so that the plane of rotation of the gyroscope weight wheels 177 may be pivoted to the left or the right in order to turn the device to the right or the left, respectively, as explained previously in connection with the vehicle of FIG. 1. The gyroscope weight wheels 177 may be rotated by a belt 180 extending between the same from a pulley shown as mounted on a countershaft 181 disposed sufficiently above the gyroscope so that the belt 180 may twist to accommodate pivotal movement of the gyroscope to the left or right. Countershaft 181 may extend between the tops of standards 182 and 182' and may be driven by a belt 183 engaging a driven pulley shown on countershaft 181 and a driving pulley shown on the main shaft of the motor M'. It will be evident, of course, that the gyroscope weight wheels 177 may be rotated in any other suitable manner and also that only one weight wheel may be substituted for the two shown. The vehicle of FIGS. 14–18 may be further provided with additional equipment, such as a gas tank 185 mounted on a post 186 and connected by a flexible hose 187 with the motor M', as in FIGS. 14 and 15, as well as a throttle control 188 for the motor M'. If desired, a housing may be placed over the vehicle, as by mounting on platform P', while seats and a cab may also be provided.

As illustrated in FIG. 19, the motor M may be pivotally mounted between brackets 11, the lower end of each of which may be provided with a flange, as shown, for attachment to the platform P. The shaft 190 of motor M may be provided at one end with sprocket 40 and at the opposite end with a pulley 191 for driving belt 112 of FIGS. 1 and 2. In addition, a pulley 192 may be mounted on shaft 190, for the purpose of driving an electrical generator (not shown) of a conventional type and in a conventional manner, for supplying current to the motor which drives the blower of air pressure device A. The housing of motor M may be provided with a cylindrical boss 193 at each end, received in a sleeve bearing 194, formed at the upper end of each bracket 11.

As illustrated in FIG. 20, the transmission unit 42 may be pivotally mounted between brackets 11', as by a cylindrical boss 193' formed at each end of the casing of the transmission unit and received in a sleeve bearing 194' formed at the upper end of each bracket 11'. The lower end of each bracket 11' may be provided with a flange, as shown, for attachment to the platform P. Sprocket 41 may be mounted on a tubular input shaft 195, which surrounds an output shaft 196, on one end of which is mounted sprocket 47. On the opposite end of output shaft 196, brake drum 38' may be mounted, while a bracket 197 may support a brake band 198 having an arcuate stiffening rib 199 and a suitable lining, together with conventional associated parts for applying the brake to drum 38'.

Figure 6:
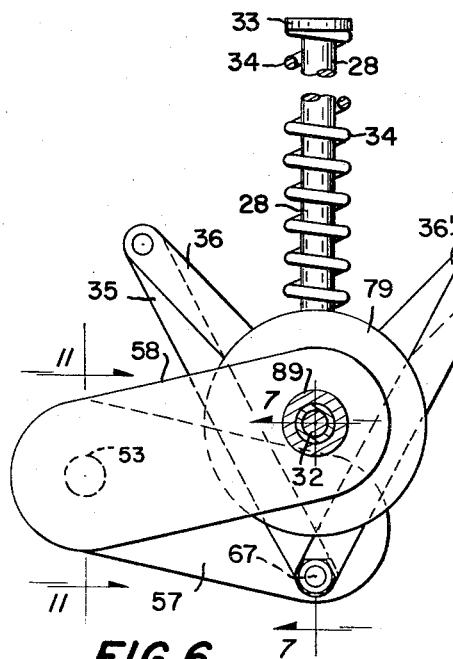
FIG. 6 is a side elevation of the drive mechanism adjacent the wheel, taken from the position of line 6—6 of FIG. 7.

As illustrated in FIG. 21, link 35 may be provided at its lower end with an apertured boss 201 for pivotal connection to pin 67 of FIG. 7 and at its upper end with a head 202 received in a cylinder 203, having an apertured boss 204 at its upper end, for pivotal connection to link 36. Springs 205 and 206, enclosed within cylinder 203, bear against opposite sides of head 202, with spring 205 also bearing against the upper end of cylinder 203 and spring 206 also bearing against a plug 207, adapted to close the lower end of cylinder 203. Link 35' of FIGS. 3 and 6 may be constructed in a similar manner, as indicated previously. As will be evident, springs 205 and 206 tend to maintain head 202 centered in cylinder 203, but will accommodate momentary changes in the vertical position of wheel W due to roughness of the road or trail, without appreciably affecting the angular position of the planetary assembly S.

In a still further embodiment of this invention, illustrated in FIGS. 22–30, a vehicle body B'', as in FIG. 22, is mounted on a frame or platform P'' having a centrally located well or opening 209 which accommodates movement of a single drive wheel W'', between the dotted positions shown, while a well cover 210 extends in spaced position around the wheel and upwardly to a slot in the top of the body, through which the wheel extends. Forwardly of a seat 211, the body has a cowling 212 and a windshield 213 to protect the driver from wind, rain, and other natural elements. Turning of the vehicle is controlled by a steering wheel 214, operatively connected to a gyroscope arrangement, including a gyroscope G'' located under seat 211, in a manner to be described later. As in FIGS. 23 and 24, platform P'' is conveniently a sled type platform having upwardly extending sides and ends, and carries motor M'', the passengers, gyroscope G'' and other associated parts supported by wheel W'', which is moved forwardly or rearwardly through a torque reaction means T'', responsive to the torque reaction of a motor M''. The connection between wheel W'' and platform P'' includes a coil spring 215 which surrounds a rod 216 extending upwardly from the platform and having a plate 217 disposed at the upper end thereof, bearing against the top of spring 215 and held down by a nut 218. The lower end of spring 215 bears against the outer end of a pivotal supporting arm 219, pivotally mounted between brackets 220, in turn mounted on the platform. A shaft 221, about the axis of which wheel W'' pivots during movement from the position of FIG. 23, i.e., the full line position of FIG. 22, to either of the dotted line positions of FIG. 22, is mounted on arm 219. A housing 222, through which the supported weight of the vehicle is transferred to the wheel, extends between and in spaced relation to the inner end of shaft 221 and the wheel axle 223, mounted in wheel hub 224, while wheel axle 223 is driven from shaft 221 through a chain 225 engaging a small sprocket on the inner end of shaft 221 and a large sprocket 226 on wheel axle 223, all within housing 222. Coil spring 215 provides a resilient connection between the wheel and the platform, to accommodate road or trail jars and bumps, arm 219 pivoting upwardly and downwardly upon compression or elongation of the coil spring. Pivotal movement of housing 222 relative to arm 219 is accommodated by the bearing interfaces of a pair of interfitting bushings 227 and 228, each surrounding shaft 221 with bushing 227 being mounted on wheel drive housing 222, as in FIG. 24, and bushing 228 being mounted on a chain housing 229, in turn mounted on arm 219. Arm 219 is provided with a bearing sleeve 230 for a shaft 221 and is also provided, at its inner end, with a bearing sleeve 231 for a shaft 232, which is also journaled in suitable bearings in brackets 220.

Wheel W'' is driven from a power takeoff shaft 234 on motor M'' and having a sprocket 235 mounted on the end thereof for an endless chain 236, which extends to and around a sprocket 237 mounted on the corresponding end of shaft 232. On the opposite end of shaft 232 is mounted another sprocket 238, which engages an endless chain 239 extending within housing 229 to and around a sprocket 240, mounted intermediate the ends of shaft 221. It will be noted that sprockets 235, 237, 238 and 240 should be the same size, to prevent a change in speed ratio and consequent torque reaction on the platform. However, it is within the contemplation of this invention to drive wheel W" through a single pair of sprockets and an endless chain or equivalents, such as one or more belts.

Figure 24:
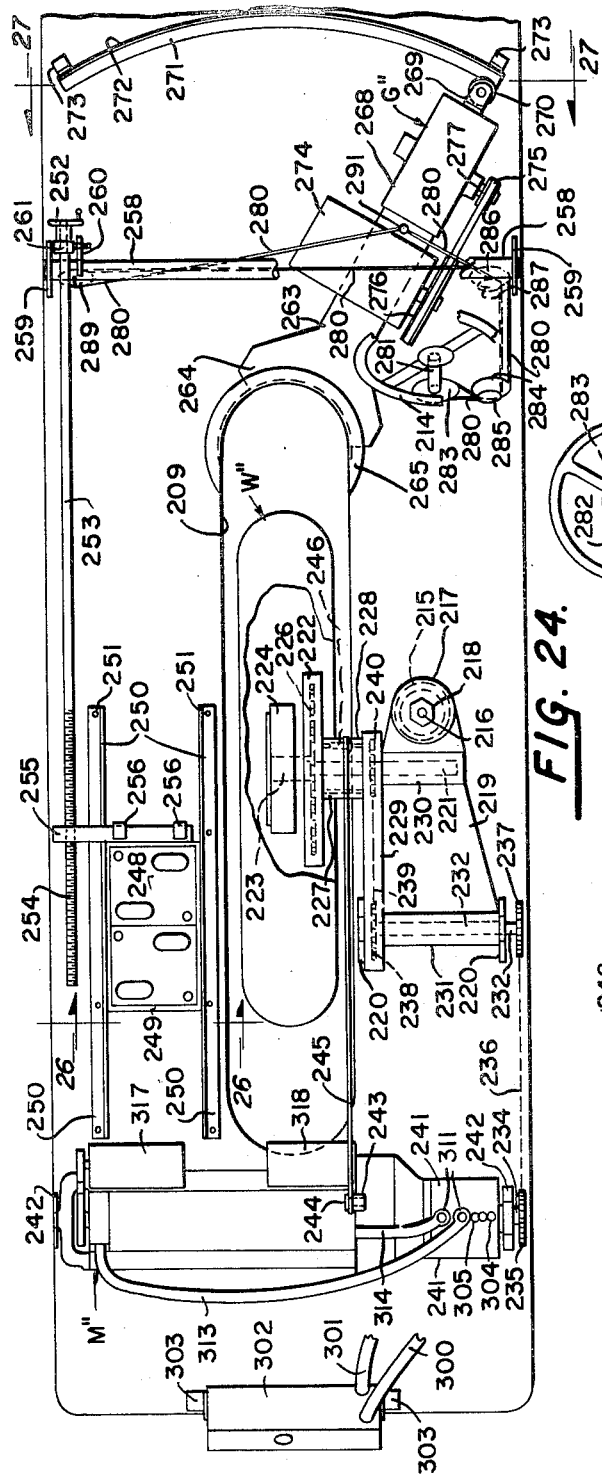
FIG. 24 is a top plan view of the vehicle as shown in FIG. 23, with certain parts broken away for clarity of illustration.
Figure 26:
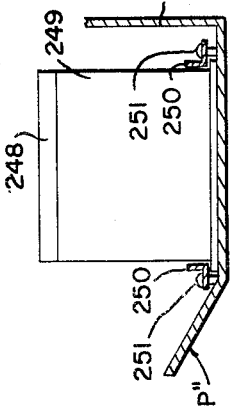
FIG. 26 is a framentary vertical section, taken on an enlarged scale along line 26—26 of FIG. 24, showing particularly the construction of a battery mount.
Figure 27:
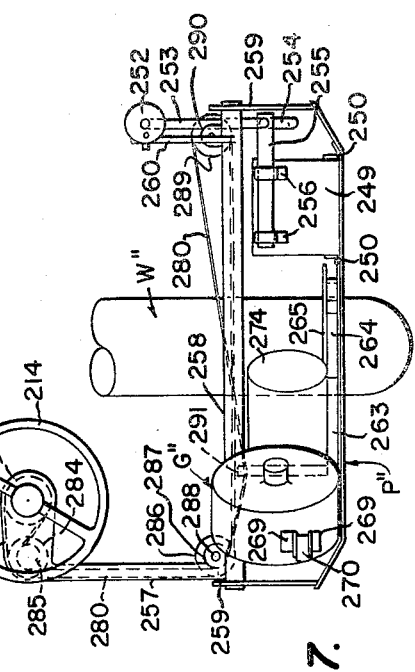
FIG. 27 is a vertical section, taken along line 27—27 of FIG. 24, showing details of the gyroscopic steering mechanism.

As in the previous embodiments, it is necessary to compensate for engine torque during acceleration and deceleration. Thus, motor M", which conveniently includes a transmission 241, is pivotally mounted between a pair of spaced brackets 242, as shown in FIG. 24, while a lever 243 extends upwardly from the engine, as in FIG. 23, and is connected by a pivot pin 244 to a link 245 which extends rearwardly to a pivot pin 246 mounted near the top of housing 222. During acceleration, motor M" will pivot in a clockwise direction, as viewed in FIG. 23, causing wheel W", through link 245, also to be pivoted in a clockwise direction, around shaft 221, so that the wheel will move toward the rear dotted line position shown in FIG. 22. Thus, the wheel will be moved rearwardly relative to the body of the vehicle, to prevent torque reaction from tipping the platform and thereby maintain platform P" and its associated parts in a generally horizontal position. Similarly, upon deceleration, motor M" will pivot in a counterclockwise direction, causing wheel W", through link 245, also to be pivoted in a counterclockwise direction, about shaft 221, toward the front dotted line position shown in FIG. 22. Thus, upon deceleration, wheel W" is moved forwardly with respect to platform P" to maintain the vehicle in a substantially horizontal position. As will also be evident, torque reaction at shaft 221, due to the difference in diameter of the sprockets engaged by chain 225, will also be compensated by movement of wheel W", since such torque reaction acts through housing 222 and in the same direction as pivotal movement of the engine, as shaft 221 rotates in the same direction as engine shaft 234.

At all times it is desirable to maintain the load on platform P" more or less balanced relative to bushings 227 and 228. Since changes in loading will occur due to the number of persons in the vehicle, their weight, and the amount of baggage, auxiliary means are provided for balancing the vehicle when the loading conditions change. Generally, it is desirable to balance the load before beginning a trip after the passengers and luggage are on the vehicle. Weight distribution can readily be adjusted by a longitudinally adjustable weight, such as by mounting a battery 248 on a battery frame 249, which is slidable within a pair of spaced longitudinal tracks 250, shown in FIGS. 24-26. The bottom of battery frame 249 slides along the platform, between the tracks 250, which are conveniently angles secured to platform P", as by means of a plurality of spaced rivets or bolts 251. The load is initially balanced by turning a hand wheel 252 to slide battery 248 longitudinally of tracks 250. For this purpose, as in FIG. 25, hand wheel 252 is mounted on the outer end of an adjusting rod 253, having threads 254 on its inner end which engage a tapped hole in a rod 255, which may be mounted for slight pivotal movement in a pair of brackets 256, mounted on the battery frame 249. Or, the threads of the tapped hole in rod 255 may be slightly loose about threads 254, to accommodate slight pivoting, in a vertical plane, of rod 253 during adjustment. It is also desirable to be able to shift the weight of the battery, for balancing purposes, while under way. This is conveniently accomplished by pulling the steering wheel 214 rearwardly or pushing the steering wheel forwardly. For this purpose, as in FIG. 25, steering wheel 214 is mounted on a supporting arm 257, in turn mounted on and pivotal with a transverse tube 258, which is pivotally mounted between a pair of spaced brackets 259, as in FIG. 24. A shorter arm 260 extends generally upwardly from the other end of pivot tube 258 and is provided with a pivoted collar 261, through which rod 253 extends and against which hand wheel 252 abuts, as shown. A friction plate arrangement may be provided, if desired, between tube 258 and brackets 259, which will maintain the tube and steering wheel in any adjusted position, but will not prevent movement to a new position.

The gyroscope G", which is used to steer the vehicle, is mounted on a supporting arm 263 having a yoke 264 at its forward end, the front end of which is arcuately concave and which extends, as in FIG. 23, between the spaced flanges of a guide 265, which is also arcuate but convex and is attached to the platform about the rear end of well 209, as in FIG. 24. Gyroscope G", as in FIG. 25, includes a weight rotating in a vertical plane, conveniently a series of discs 266 mounted on a shaft 267 and rotating within a housing 268, which is mounted at the rear end of arm 263. The rear side of housing 268 is conveniently provided with a pair of brackets 269 for rotatably mounting a roller 270, which rests on a flange 271 of an arcuate track 272, thereby supporting the rear end of arm 263. Track 273 is conveniently mounted on platform P by a spaced series of angular brackets, such as brackets 273 of FIGS. 24 and 25. Thus, it can be seen that support arm 263 is adapted to swing from a central position to the left side of the vehicle, as in FIG. 24, or a similar position on the other side of the vehicle. Gyroscope G" is conveniently driven by an electric motor 274, mounted on support arm 263 forwardly of the gyroscope G", while the drive connection between motor 274 and the gyroscope conveniently comprises an endless belt 275 extending between a large pulley 276 on the motor shaft and a smaller pulley 277 on the gyroscope shaft, as in FIGS. 23 and 24, to drive the gyroscope at a relatively high speed. Power is supplied to motor 274 from battery 248 through conventional electrical wires (not shown).

The movement of gyroscope G" from one side of the vehicle to the other is controlled from steering wheel 214 through an endless cable 280, in the following manner. The steering wheel is mounted on the upper end of a steering column 281, as in FIG. 25, which is rotatably supported in a pulley housing 282 at the top of arm 257, as in FIG. 27, while a pulley 283 is attached to the lower end of the steering column, as in FIG. 24. Cable 280 extends around pulley 283, one portion thereof extending over a larger pulley 284 mounted at the top of arm 257 and another portion thereof extending over a smaller pulley 285, concentric with pulley 284, as in FIG. 27. The two portions of cable 280 then extend downwardly through the center of support arm 257, the first portion passing around a larger pulley 286 and the other portion passing around a smaller pulley 287, concentrically mounted in a U-shaped bracket 288, in turn mounted at the left end of tube 258. The first portion then extends within tube 258 across the vehicle and around a pulley 289, mounted in a U-shaped bracket 290 mounted at the right end of tube 258, then back across the vehicle, passing under tube 258, to a guide post 291, mounted upon support arm 263 between gyroscope G" and motor 274, as in FIGS. 23 and 24. The other portion of cable 280, after passing around pulley 286, is also attached to post 291, as in FIGS. 24 and 27. The cable 280 is tensioned around all of the pulleys, so that, upon turning the steering wheel 214 in a counterclockwise direction, or to the left, the gyroscope will be moved to the position shown in FIG. 24, and upon turning the steering wheel in a clockwise direction, the gyroscope will be swung to the right side of the vehicle. With this arrangement, there will be a precessional effect, that is, when the gyroscope is moved to the left, as to the position shown in FIG. 24, the reaction of wheel W" on the ground will cause the vehicle to pivot on a vertical axis and turn to the left, to follow around a curve. Also, the weight of the gyroscope will be on the left side of the vehicle when a left turn is being made, so as to bank the vehicle in that direction, while the twisting of the gyroscope to the right, as viewed from above, in this instance, will cause the gyroscope to tend to tip to the left, as viewed from the rear, which assists the vehicle in turning to the left. Conversely, when it is desired to turn to the right, the steering wheel is merely turned in a clockwise direction, swinging the gyroscope to the right side of the vehicle, causing the reaction of wheel W″ on the ground to pivot the vehicle about a vertical axis and turn the front end of the vehicle to the right. Again, the vehicle will follow around a curve and the gyroscope will bank the vehicle to the right as it turns.

Because motor M″ pivots rearwardly and forwardly between a pair of spaced brackets 242 in response to acceleration and deceleration torque, as described above, it is necessary to provide means for supporting the radiator hoses and electrical and other lines so that they will not interfere with this pivotal movement of the motor. As in FIGS. 23 and 24, each of a pair of radiator hoses 300 and 301 is connected at one end to the top and bottom, respectively, of a radiator 302, mounted forwardly of the motor on platform P″, as by a pair of angle brackets 303. Hoses 300 and 301, as well as electrical and other cables 304 and fuel tube 305, extend to a stationary bar 306, which extends transversely of the vehicle above transmission 241, as in FIG. 28, and is conveniently supported from the body B″, or by a post extending upwardly from the left engine bracket 242, or in any other convenient manner. The hoses and cables are attached to bar 306, as by U-bolts 307 clamping 90° L's 308, to each of which one of hoses 300 and 301 is connected, as in FIG. 30, and cables 304 and fuel hose 305 clamped between a bracket 309, depending from bar 306, and a plate 310, as in FIG. 29. As in FIGS. 28 and 30, hoses 300 and 301 are connected through hoses 311 with L fittings 312, conveniently mounted atop transmission 241 and from which hoses 313 and 314 lead to opposite ends of the engine block, as in FIG. 24. Cables 304 and fuel hose 305 are also attached to the top of transmission 241, as by a bracket 315 and a clamping plate 316, as in FIG. 29. It will be noted that the water hoses, gas tube and cables have sufficient slack between the transmission 241 and support bar 306 that they have a generally bowed or curved configuration when the motor is in vertical position. This arrangement permits motor M″ to swing in either direction without interference, as indicated in FIG. 29 for cables 304, since the cables, as well as the water hoses and gas line, will merely straighten out, as shown by the dotted positions, to the left and right, for cables 304 in FIG. 29. Also, all of the hoses, lines, and wires are held in a position out of the way of the engine, but at the same time they are easily accessible for repair and/or replacement. The gas line or tube 305 extends along the engine to the carburetor, which is conventional and therefore not shown. Also, one electrical cable 304 will extend to the distributor, others to the generator 317 and starter 318 of FIG. 24, and another to transmission 241, if electrically operated. In the event the transmission is manually operated, one of the cables 304 may be a push-pull cable for that purpose, while if a clutch is provided, it may also be operated by a push-pull cable. In addition, the engine throttle will be controlled by a push-pull cable and an electrical cable or pressure tube will extend from the oil pressure indicator to the engine.

Although different embodiments of this invention have been illustrated and described in detail, it will be understood that features of one embodiment may be used in others and that additional features or equivalents thereof, including not only those described herein but others, may be used, and also that other embodiments of this invention may exist, without departing from the spirit and scope thereof.

What is claimed is:
1. A vehicle comprising a driving and supporting wheel; a platform; means connecting said wheel with said platform whereby said platform is supported by said wheel and said wheel is movable forwardly and rearwardly relative to said platform; an engine pivotally mounted on said platform; drive means for rotating said wheel and connected with said engine; and means interconnecting said wheel connecting means and said engine and responsive to pivotal movement of said engine due to torque reaction of said engine, for causing said wheel to shift forwardly and rearwardly with respect to said platform.

2. A vehicle as defined in claim 1, wherein said torque reaction means includes a lever connected to said engine.

3. A vehicle as defined in claim 1, wherein said drive means is mounted in part on said wheel connecting means.

4. A vehicle as defined in claim 1, wherein said means connecting said wheel with said platform includes pivoted means interconnecting said wheel axis and said platform.

5. A vehicle as defined in claim 4, wherein said wheel connecting means includes a spring opposing movement of said wheel away from the point of attachment of said pivoted means to said platform.

6. A vehicle as defined in claim 5, including a member at said wheel axis and a member pivoted on said platform; and wherein said spring engages one of said members and a spring engaging element is attached to the other of said members.

7. A vehicle as defined in claim 6, including a movable drive connection extending between said members.

8. A vehicle as defined in claim 4, including a linkage connection on each side of said pivoted means.

9. A vehicle as defined in claim 8, including a stop for limiting movement of said linkage connections.

10. A vehicle as defined in claim 1, wherein said wheel connecting means includes a first member pivoted on said platform and a spring engaging said member; and said vehicle includes a second member mounted on said platform and engaged by said spring to oppose movement of said first member in one direction.

11. A vehicle as defined in claim 10, including a third member pivotally connected to said first member and said wheel.

12. A vehicle as defined in claim 1, wherein said wheel connecting means includes a first member pivoted on said platform; means mounted on said platform supporting a spring abutment at a position above said first member; and a spring engaging said abutment and said first member to oppose movement of said first member away from said platform.

13. A vehicle as defined in claim 1, including a single member pivotally interconnecting the axis of said wheel and said platform.

14. A vehicle as defined in claim 13, including a lower shaft driven from said engine; a support for said lower shaft mounted on said platform, said single member being pivotally mounted on said lower shaft support; a shaft for said wheel and a bearing for said wheel shaft mounted on said single member; a countershaft mounted for rotation on said single member outwardly from said wheel shaft and parallel to said lower shaft and wheel shaft; a speed reducing drive connection between said lower shaft and countershaft; a speed reducing drive connection between said countershaft and wheel shaft; and a lever connecting said engine and said member outwardly from said wheel shaft.

15. A vehicle as defined in claim 1, wherein said drive means includes a transmission unit pivoted on said platform, driven by said engine; a lower shaft driven from said transmission unit and rotatably mounted on said platform; a countershaft driven from said lower shaft and spaced therefrom; an upper shaft connected to said wheel; a planetary gear system driven from said countershaft and driving said wheel shaft; a torque block pivotally mounted on said platform at the position of said lower shaft and having a torque arm extending therefrom; a lever connection between said engine and said transmission unit; a lever connection between said transmission unit and said torque arm; a rod extending normally upwardly from said torque block and having a spring abutment at its outer end; a sleeve surrounding said rod; a compression spring surrounding said rod and bearing between said abutment and said sleeve; a link plate housing provided with an axially extending pin pivoted in said sleeve, said housing being provided with an annular flange having an arcuate slot at each side; a bearing carried axially by said housing, a ring gear element of said planetary transmission being provided with an axially extending pin pivoted in said bearing; a pair of link plates surrounding said bearing and each having an upper link extending through the respective slot of said housing, each said link plate having a shoulder thereon inwardly of said link and said ring gear element having an ear extending into the space between said shoulders for engagement with either or both of said shoulders; a pair of lower links, the upper end of each being pivotally attached to the upper end of one said upper link; and a pin mounted on said platform adjacent said lower shaft, the lower ends of said lower links being pivoted on said pin.

16. A vehicle comprising a platform having a central opening; a single driving and supporting wheel movable forwardly and rearwardly in said opening; an engine pivotally mounted on said platform and disposed transversely thereof; a first shaft extending transversely of said platform and mounted for rotation in a pair of brackets extending upwardly from said platform; a drive connection between said engine and said first shaft; an arm pivotally mounted between said brackets and having a bearing sleeve surrounding said first shaft and extending rearwardly therefrom, said arm having a second bearing sleeve extending transversely thereof in parallel relation to said first bearing sleeve and rearwardly thereof, said arm extending rearwardly from said second bearing sleeve; a post extending upwardly through the rear end of said arm and provided at its upper end with a spring abutment; a coil spring in engagement with said abutment and said arm and surrounding said post; an axle for said wheel and provided with a sprocket; a housing for said sprocket and extending downwardly therefrom; a second shaft mounted for rotation in said second bearing sleeve and extending into the lower end of said housing; a chain and sprocket drive connection between said first and second shafts; a housing for said chain and sprocket drive connection mounted on said arm; a sprocket on the end of said second shaft and a chain forming a drive connection between said second shaft sprocket and said wheel axle sprocket; a first bushing surrounding said second shaft and mounted on said wheel axle housing at the lower end thereof; a second bushing surrounding said second shaft and mounted on said housing for said chain and sprocket drive connection between said first and second shafts, said first and second bushings interfitting to permit pivotal movement of said wheel sprocket housing relative to said plate, said wheel sprocket housing and said arm supporting said platform from said wheel; and a link connecting said engine and said wheel sprocket housing, one end of said link being pivotally connected to said engine at an upper position thereof and the opposite end of said link being pivotally connected to said wheel sprocket housing above said second axle.

17. A vehicle comprising a driving and supporting wheel; a platform supported by said wheel; an engine pivotally mounted on said platform; drive means for rotating said wheel and connected with said engine; a housing mounted on said platform and having a greater longitudinal area adjacent one end of said platform; an extensible element adjacent the opposite end of said platform and providing an increasing longitudinal area upon increased extension; means responsive to the torque reaction of said engine for extending and retracting said extensible element; and means operable by said torque reaction responsive means for shifting said wheel forwardly and rearwardly with respect to said platform.

18. A vehicle as defined in claim 17, wherein said housing includes a cab at said one end of said vehicle having a greater longitudinal area than said housing at the opposite end of said vehicle; and said extensible element is a fan-like member pivoted at its lower end at said opposite end of said vehicle.

19. A vehicle as defined in claim 26, wherein said force producing means comprises an air blower and a series of shutters for controlling the direction of discharge of air from said blower.

20. A vehicle comprising a single driving and supporting wheel; a platform supported by said wheel; an engine mounted on said platform; drive means for rotating said wheel interconnecting said engine and said wheel; a gyroscope rotatable in a vertical plane; means for rotating said gyroscope; means for supporting said gyroscope for movement generally laterally across said platform about an axes spaced from said gyroscope; and means for moving said gyroscope supporting means about said axis and across said platform.

21. A vehicle as defined in claim 20, including a weight mounted for movement longitudinally of said platform; and means interconnecting said weight and said platform for adjusting the longitudinal position of said weight along said platform.

22. A vehicle comprising a single driving and supporting wheel; a platform supported by said wheel and provided with a central well in which said wheel is movable forwardly or rearwardly; a gyroscope rotatable in a vertical plane; means for rotating said gyroscope; an arm supporting said gyroscope and provided at its forward end with a yoke; a guide for said yoke disposed at the rear end of said well, said yoke and arm being pivotal around said guide; an arcuate track extending across said platform at the rear thereof; a roller connected with said arm and engaging said track; a post extending upwardly from said arm; a tube extending transversely of said vehicle and mounted for pivotal movement about a horizontal axis; a hollow arm extending upwardly from one end of said tube; a steering column rotatably mounted at the upper end of said arm; a steering wheel attached to the upper end of said steering column; a second arm extending generally upwardly from the opposite end of said tube; a battery disposed forwardly on said platform at a position in general longitudinal alignment with said second arm; guide means on said platform for longitudinal movement of said battery; an adjustment rod for moving said battery and extending to said second arm; means associated with said battery and operatively connected with said rod for moving said battery forwardly and rearwardly of said platform when said rod is turned; a handle on said second arm for turning said adjustment rod; pulleys mounted at the upper end of said arm, the lower end of said steering column and at each end of said tube; and a cable extending around said pulleys and through said first arm, a portion of said cable extending through said tube and the opposite ends of said cable being connected to said post, whereby turning of said steering wheel will cause said arm and gyroscope to be shifted across said platform and forward and rearward movement of said steering wheel, transmitted through said hollow arm, will cause said second arm, through said rod, to move said battery forwardly and rearwardly on said platform.

23. A vehicle comprising a driving and supporting wheel; a platform; means connecting said wheel with said platform whereby said platform is supported by said wheel and said wheel is movable forwardly and rearwardly relative to said platform; an engine having a transmission, each pivotally mounted on said platform; drive means for rotating said wheel interconnecting said engine and said wheel; means interconnecting said wheel connecting means and said engine and responsive to pivotal movement of said engine and transmission due to torque reaction of said engine and transmission, for causing said wheel to shift forwardly and rearwardly with respect to said platform; a radiator mounted on said platform and spaced from said engine; a fuel tube connected to said engine; hoses connecting said engine and said radiator; electrical and control cables connected to said transmission and said engine; a bar supported on said vehicle and disposed at an elevated position above said transmission, each of said hoses, tube and cables being flexible and having a sufficient length between said upper and lower positions that said hoses, tube and cables are bowed with said engine in a vertical position but tend to straighten between upper and lower positions, when said engine and transmission pivot due to torque reaction.

24. A vehicle comprising a driving and supporting wheel; a platform; means connecting said wheel with said platform whereby said platform is supported by said wheel and said wheel is movable forwardly and rearwardly relative to said platform; an engine pivotally mounted on said platform; drive means for rotating said wheel and connected with said engine; means interconnecting said wheel connecting means and said engine and responsive to pivotal movement of said engine due to torque reaction of said engine, for causing said wheel to shift forwardly and rearwardly with respect to said platform; a gyroscope rotatable in a vertical plane and mounted for pivotal movement about a vertical axis; and means mounted on said vehicle for turning said gyroscope about said vertical axis.

25. A vehicle comprising a single driving and supporting wheel; a platform supported by said wheel; an engine mounted on said platform; drive means for rotating said wheel and interconnecting said engine and said wheel; a gyroscope rotatable in a verticle plane and mounted for pivotal movement bodily about a vertical axis; means for turning said gyroscope about said vertical axis; a weight movable laterally of said platform; and means connecting said gyroscope turning means with said weight for shifting said weight as said gyroscope is turned.

26. A vehicle comprising a single driving and supporting wheel; a platform supported by said wheel; an engine mounted on said platform; drive means for rotating said wheel and connected with said engine; means responsive to variations in longitudinal balance of said platform; force producing means, separate from said responsive means, for producing a force tending to counteract such variations in longitudinal balance; and means connecting said responsive means and said force producing means for controlling said force producing means.

References Cited in the file of this patent
UNITED STATES PATENTS

| | | |
|---|---|---|
| 925,709 | Leavitt | June 22, 1909 |
| 991,485 | Darrow | May 9, 1911 |
| 1,236,030 | Wilson | Aug. 7, 1917 |
| 1,290,087 | Christie | Jan. 7, 1919 |
| 1,513,143 | Welch et al. | Oct. 28, 1924 |
| 2,267,254 | Reilley | Dec. 23, 1941 |
| 2,415,056 | Wheeler | Jan. 28, 1947 |